US005239162A

United States Patent [19]

Haun et al.

[11] Patent Number: 5,239,162

[45] Date of Patent: Aug. 24, 1993

[54] ARC PLASMA TORCH HAVING TAPERED-BORE ELECTRODE

[75] Inventors: Rob E. Haun, Ukiah; Neil C. Elmer, Potter Valley; Robin A. Lampson, Ukiah, all of Calif.

[73] Assignee: Retech, Inc., Ukiah, Calif.

[21] Appl. No.: 828,385

[22] Filed: Jan. 30, 1992

[51] Int. Cl.[5] .................................... B23K 9/00

[52] U.S. Cl. .................... 219/121.52; 219/121.51; 219/121.59; 219/119

[58] Field of Search ........... 219/121.52, 121.5, 121.51, 219/121.48, 121.36, 75, 119

[56] References Cited

U.S. PATENT DOCUMENTS

| | | | |
|---|---|---|---|
| 2,379,187 | 6/1945 | Richards | 219/119 |
| 3,471,675 | 10/1969 | Sargent et al. | 219/75 |
| 3,780,259 | 12/1973 | Meyer | 219/75 |
| 4,002,878 | 11/1977 | Disney | 219/121.52 |
| 4,549,065 | 10/1985 | Camacho et al. | 219/121.48 |
| 4,891,490 | 1/1990 | Labrot et al. | 219/121.52 |
| 4,924,059 | 5/1990 | Rotolico et al. | 219/121.52 |

*Primary Examiner*—Mark H. Paschall
*Attorney, Agent, or Firm*—Townsend and Townsend Khourie and Crew

[57] ABSTRACT

An arc plasma torch having a tapered-bore electrode provides a long, columnar plasma arc. The torch includes a torch housing, a tapered-bore electrode, a gas-constricting nozzle, and a swirling gas flow generator. The electrode is mounted within the housing and has a closed inner end and an open outer mouth. The electrode has a longitudinally extending, tapered bore. The bore has its largest dimension at the mouth. The nozzle has a bore and is also mounted within the housing. The nozzle is in axial alignment with, forwardly spaced with respect to and insulated from, the tapered-bore electrode. The torch introduces a swirling flow of gas at a location intermediate the electrode and the gas-constricting nozzle, resulting in gas flowing past the electrode during use of the torch. In operation, an electric arc emanating from the electrode ionizes the gas flow.

7 Claims, 2 Drawing Sheets

ARC PLASMA TORCH HAVING TAPERED-BORE ELECTRODE

BACKGROUND OF THE INVENTION

1. Field of the Invention

The present invention relates to an arc plasma generation apparatus suitable for furnace melting, welding, and cutting applications. More particularly, the invention relates to an arc plasma torch equipped with a tapered bore electrode.

2. Description of the Related Art

The use of arc furnaces equipped with arc plasma torches is common for melting and refining applications involving metals and alloys. Furnaces employing arc plasma torches are particularly useful in melting reactive metals because such metals rapidly react or splatter when heated in certain atmospheres.

A typical arc plasma torch employs a cylindrical, straight-bore electrode; a gas-constricting nozzle, spaced away from the electrode; a chamber which surrounds the space between the electrode and the nozzle; and a means for generating a vertical flow of pressurized arc gas which extends back up into the chamber and bore of the electrode and swirls down through the front of the nozzle. This type of design is often referred to as a swirl flow torch. Because of the nozzle's constricting effects, the plasma arc resembles a column.

In the presence of an arc, the pressurized arc gas becomes ionized, thereby forming an arc plasma which is expelled through the constricting nozzle as a swirling, superheated plasma jet. The swirling arc gas also helps to protect the electrode from erosion or contamination because the point on the electrode from which the arc emanates (arc termination point) tends to spin with the arc gas instead of remaining at a singular spot.

An arc plasma torch develops heat by a plasma arc which is drawn between the arc plasma torch electrode and the workpiece (often called the transferred mode). Alternatively, heat may be developed between a torch electrode and a second, external electrode (called non-transferred mode). The transferred mode is usually more efficient because energy transfers directly from the torch to the workpiece, rather than partially dissipating to a separate electrode.

Most advantages offered by plasma arc melting relate to the columnar properties of the arc. Constriction of the plasma arc into a column increases the directional stability of the arc. Thus, the arc is stiffer and is easier to focus in the direction pointed. The constricted arc has high current density and high heat energy concentration in a narrow zone. Because the arc is column-shaped, it also has less sensitivity to differences in arc length and torch stand-off.

The prior art includes designs both for generating arc plasma and for incorporating material for treatment by such plasma. Baird (U.S. Pat. No. 3,194,941) and Camacho (U.S. Pat. No. 3,673,375), both incorporated herein by reference, exemplify two prior art approaches to arc plasma torch design.

Baird (U.S. Pat. No. 3,194,941) is believed to have developed the original swirl flow torch sold by Union Carbide Corporation. Baird instructs that the ratio of the nozzle length (B) to the nozzle inside bore (C) is critical. Recommended values of B/C are between 1.2 and 3.0, with 2.0 being the optimal ratio. According to Baird, values of B/C less than 1.2 cause double arcing. Baird also teaches that much greater values of B/C make arc transfer difficult and reduce the heat efficiency of the arc effluent.

The prior art further includes U.S. Pat. No. 4,718,477 (the '477 patent) issued to Camacho, which is also incorporated herein by reference. It discloses that plasma torch operation in a vacuum results in a significant reduction of the voltage gradient (arc voltage divided by arc length) as compared to operation under atmospheric pressure, which in turn significantly reduces the available output power of the torch for a given arc length.

The '477 patent further states that even though the power level is proportional to the arc length, under vacuum conditions, the voltage gradient may be so low that an increase in arc length provides little increase in power. The '477 patent seeks to overcome the problem of low power levels in the arc by positioning a reduced diameter nozzle just forward of the cylindrical, straight-bore electrode so that the vertical gas flow induced between the electrode and the nozzle generates a back pressure upstream of the nozzle. The effect of this that the portion of the arc upstream of the nozzle is subjected to a relatively higher pressure which in turn increases the voltage gradient. As a result, the overall length of the arc can be increased and greater power levels can be achieved.

It is noted, however, that the increase in arc length is upstream of the nozzle so that the effective arc length outside the torch, that is, between the end of the torch and the pool of metal being heated by the plasma, does not change and remains relatively short. As a result, the "stand-off" length of the torch, that is, the length of the portion of the arc between the molten pool and the torch end, remains relatively short. Consequently, large pieces of metal that are being fed into the furnace for melting may contact the end of the torch and cause shorting and torch damage.

It is well known that maintenance of a long arc length between the torch and the workpiece is desirable because, generally speaking, this provides the arc with greater power. A concomitant benefit of a long arc length is a long stand-off distance between the torch and the workpiece. A long stand-off enables easy feeding of material between the molten pool and the torch body without damaging the torch.

Thus, it is an important aspect of plasma melting to generate an arc which is long enough to enable easy feeding of material between the molten pool and the torch body without damaging the torch while maintaining the desired, relatively high power output of the torch. The present invention provides a plasma torch which has these characteristics.

SUMMARY OF THE INVENTION

Applicants have discovered that by constructing an otherwise conventional plasma torch of the type generally discussed above with an electrode having an internal bore which is tapered over at least a portion of its length makes it possible to generate relatively long arc lengths. The tapered portion of the electrode bore extends from the open end of the electrode, i.e., the end which faces the molten pool of metal in the furnace, and the arc is anchored in this tapered portion of the bore, rather than near the rear end of the electrode, as was intended, for example, in the above-discussed '477 patent. As a result, the arc length protruding past the end of the torch is substantially longer, which correspondingly increases the stand-off length for the torch. Thus, even relatively large solid metal pieces can be accommodated between the pool of molten metal and the torch without causing electrical shorts and/or physical damage to the torch.

Research suggests that plasma torches with large-diameter electrode bores cause the arc termination region to retreat deeper into the electrode bore, i.e. to the vicinity of the closed end thereof. On the other hand, small-diameter internal electrode bores cause the arc termination region to come forward. Each of these small- and large-diameter extremes have attendant problems.

Although a small-diameter electrode bore forces the arc termination region forward, and thereby lengthens the arc protruding from the torch and the stand-off length, it also causes erosion and overheating in the most difficult-to-cool area of the electrode, i.e. at its forward end. A large-diameter electrode causes the arc termination region to retreat, thereby undesirably shortening the stand-off length while significant erosion occurs, probably because of reduced gas flow, at the rear end of the electrode bore.

The tapered bore of the present invention stabilizes the arc termination region in the tapered bore at the forward portion of the electrode. This appears to be the result of counterbalancing forces created by this electrode configuration which affect the arc termination. The relatively large diameter at the mouth of the electrode causes the arc termination region to retreat rearwardly into the electrode bore. However, the decreasing bore diameter resulting from the taper limits the retreat of the arc termination region, thereby overcoming the disadvantages of small bore diameter electrodes while providing a significantly greater stand-off length for the torch.

Thus, the tapered-bore electrode configuration of the present invention takes advantage of counterbalancing forces to anchor the arc termination point at a location in the forward portion of the electrode that is easy to cool and where gas flow rates are high to further assure a spinning of the arc and thereby minimize electrode erosion.

One embodiment of the present invention provides a plasma torch defined by a torch housing mounting a tapered-bore electrode, a gas constricting nozzle, and a gas vortex generator. The electrode has a closed inner or aft end and an open front end or outer mouth. The nozzle is in axial alignment with, forwardly spaced of and insulated from, the tapered-bore electrode.

During use, the torch directs a pressurized arc gas past the electrode and generates a vertical or swirling flow of the gas at a location intermediate the electrode and the gas-constricting nozzle.

Without fully understanding the underlying reasons, the applicants have found that the tapered-bore electrode of the present invention offers many advantages over the conventional, straight-bore electrode configuration.

By anchoring the arc in the forward region of the electrode, a plasma arc torch equipped with a tapered-bore electrode provides greater arc length and a corresponding greater torch stand-off than are obtainable with a traditional straight-bore electrode. The hypothesis for the improvement is that the tapered-bore electrode produces a lower voltage gradient in the plasma plume. For example, the plume voltage drop provided by a straight-bore electrode might be 14 volts per inch in helium at one atmosphere. Under the same operating conditions, the voltage drop provided by the tapered-bore electrode appears to be only about 8 volts per inch. A lesser voltage drop in the plume increases the length of the arc and allows the torch to rise higher over the workpiece for a given voltage. The resulting greater torch stand-off length is desirable to accommodate workpieces of larger size without extinguishing the arc or damaging the torch.

In addition, the tapered-bore electrode of the invention seems to improve the spin of the arc at the arc termination point. Improved rotation of the arc termination point helps to reduce electrode erosion and enhances stable arc operation. The improved arc rotation inside the electrode bore may result from the relatively large diameter of the bore at the front end of the electrode, coupled with the relatively short distance between the electrode end and the arc termination region although, applicants point out, the precise reasons for this improvement remain unclear.

Moreover, the tapered-bore electrode requires less-frequent replacement. This is probably due to improved rotation of the arc, which, in turn, avoids overheating.

Further, the tapered electrode allows use of a shorter overall length, thereby saving electrode material costs. Historically, the industry has believed that a long electrode was necessary or at least desirable.

The torch and electrode combination of the present invention further provides economy by requiring less gas flow to produce an arc plasma.

Finally, the described embodiment of the present invention works well in transferred-arc furnace applications. However, the present invention is equally applicable to non-transferred arc applications. The present invention is similarly useful in the arts of plasma arc welding and plasma arc cutting.

Other advantages and features of the invention will become apparent after considering the following drawings and detailed description.

DETAILED DESCRIPTION OF THE PREFERRED EMBODIMENTS

Figure 1:
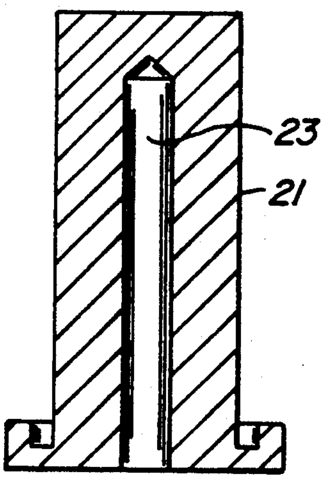
FIG. 1. PRIOR ART
FIG. 1 is a schematic diagram showing the tapered-bore electrode of the present invention for a plasma torch.
Figure 3:
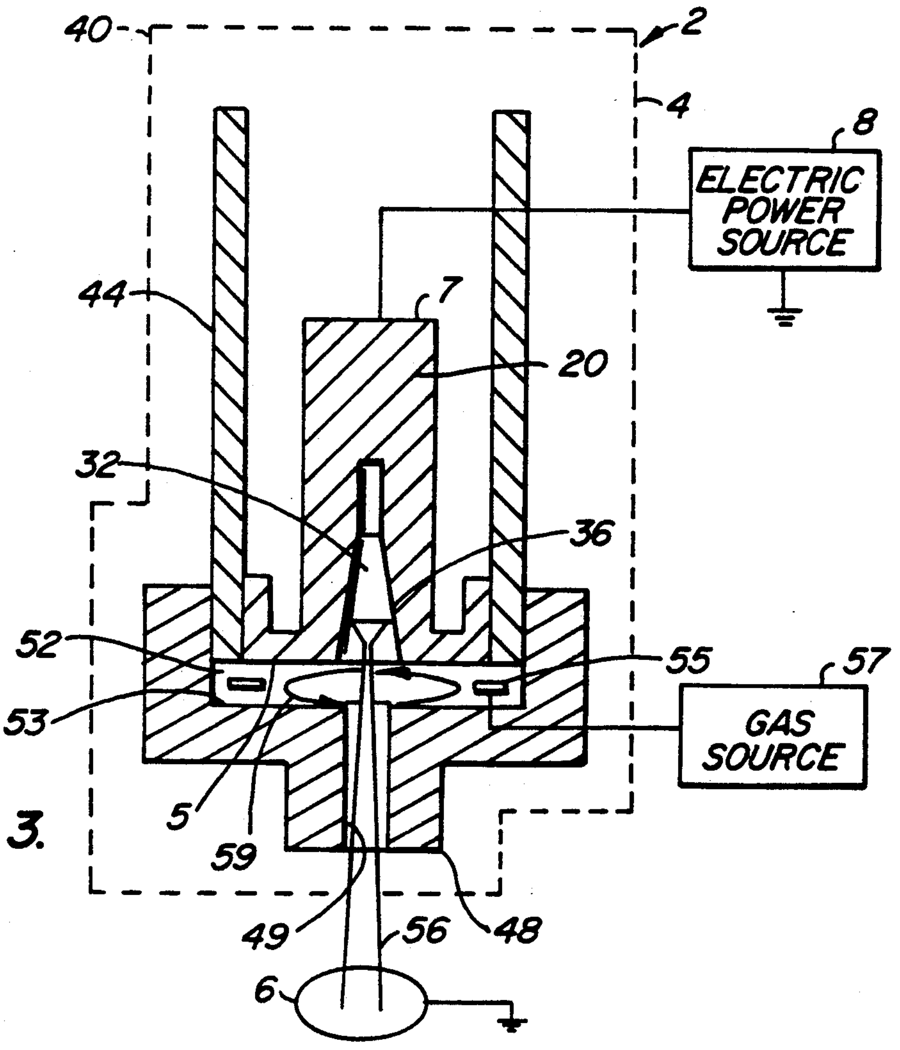
FIG. 3 is a schematic diagram showing a plasma torch having a tapered-bore electrode constructed in accordance with the present invention.

Referring first to FIGS. 1 and 3, a plasma torch 2 shown in FIG. 3 only, constructed in accordance with the present invention, is defined by a (schematically illustrated) plasma torch housing 4, which mounts a generally cylindrical, elongated electrode 20 having an internal bore or chamber 32 which is open at a forward end 5 of the electrode facing generally toward a pool of molten metal 6 in the furnace. An aft end 7 of the electrode is closed so that the electrode bore 32 is a blind bore. The electrode is suitably connected to an electric power source 8, which is grounded with the molten metal pool 6 to generate an electric potential between the electrode and the pool.

The torch housing further mounts a schematically illustrated nozzle 48, which extends across the forward end 5 of the electrode and includes a through bore 49 which is in axial alignment with electrode bore 32. The nozzle is configured to establish a cylindrical vortex or swirl chamber 52 between the forward end of the electrode and the rearwardly facing surface 53 of the nozzle. One or more gas injection orifices 55 in fluid communication with a gas source 57 are arranged to inject a suitable gas into swirl chamber 52 so that the gas swirls about the axis of the aligned electrode bore 32 and nozzle bore 49, as indicated by elliptical arrows 59 in FIG. 3.

The torch as a whole and the electrode and nozzle in particular are suitably cooled, typically with water. Such cooling systems are well known in the art, are also described in the above-referenced prior art patents, and, therefore, the cooling of the plasma torch is not further discussed herein.

In operation, electric power source 8 is activated to generate a potential between pool 6 and electrode 20. An arc between them is initiated and gas from source 57 is injected through ports 55 into swirl chamber 52, thereby forcing swirling gas in a downstream direction toward the pool through nozzle opening 49. The electric arc 56 becomes anchored inside electrode bore 32, it superheats and ionizes the swirling gas forced through nozzle opening 49 and thereby generates hot plasma gas which is blown against pool 6. The plasma gas melts any solid metal pieces that may be in the pool and maintains the pool at the desired temperature, as is well known in the art. The swirling gas also rotates the arc, thereby spinning the arc anchor point in the electrode bore.

Referring to FIG. 1, the electrode 20 of the present invention has a uniform outer diameter and includes an open mouth 24, a closed end 7, and the internal electrode bore 32. The electrode bore is defined by an internal, tapered wall 36 extending over a portion of the bore length and a cylindrical, constant diameter section 40 which terminates at a blind bore end 28. The bore diameter is greatest at the open mouth and decreases from there in the direction toward the cylindrical bore section.

Figure 2:
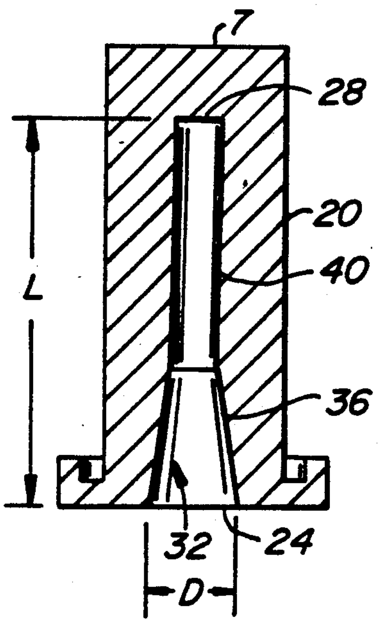
FIG. 2 is a schematic diagram similar to FIG. 1, but showing a prior art straight-bore electrode.

In comparison, FIG. 2 shows a prior art electrode 21. It has a constant-diameter internal bore 23.

Preferably, the electrode 20 is of a one-piece homogeneous construction and it is made of a suitable material which is chosen depending on choice of plasma gas. Copper, aluminum, silver, molybdenum, and zirconium are among the materials typically used with reactive gases. For inert gases, recommended materials for the electrode include tungsten, tungsten alloys, carbon and copper.

For reasons that remain unclear, it appears that best results are achieved with electrodes having a tapered bore with an axial bore length (L) less than ten times the bore dimension (D) at the mouth 24 of the electrode bore 36. The diameter of the nozzle bore 49 should be about the same as, or slightly less than, the largest electrode bore diameter (D).

Figure 6:
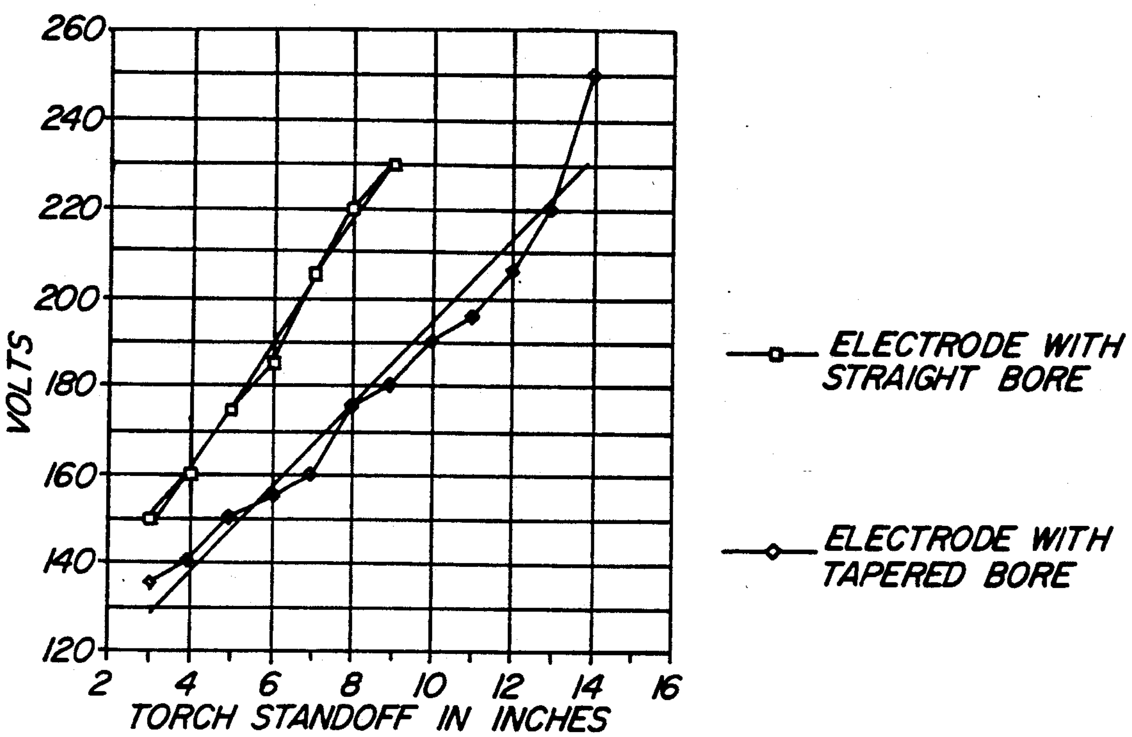
FIG. 6 is a plot of voltage versus torch stand-off distance for both a tapered-bore electrode and a prior art straight-bore electrode.

FIG. 6 provides a plot of voltage versus torch stand-off distance for an electrode with a tapered-bore (FIG. 2) and one with a constant diameter bore (FIG. 1). Comparison tests between the two electrodes were run at 1200 amperes of electrode current, and the ionizing gas was helium. The tapered bore electrode used in the test had a large diameter of 0.95 inch at the electrode mouth, a wall taper of 7.5 degrees relative to the axis, and the cylindrical aft section of the bore had a diameter of 0.5 inch. The axially projected length of the tapered section was 1.709 inches and applicants surmise, but cannot accurately tell, that the arc was anchored to the tapered wall about 1 inch from the electrode mouth. FIG. 6 illustrates that the tapered-bore electrode provides a marked improvement in stand-off length per volt applied. For example, at an applied voltage of 220 volts the tapered-bore electrode provides a 13-inch stand off length (see FIG. 4). At the same voltage, a prior art straight-bore electrode with a bore diameter of 0.813 inch provides only 8 inches of stand-off length (see FIG. 5). At 160 applied volts, the stand-off lengths are 7 inches and 4 inches, respectively, for the tapered and straight-bore electrodes.

Figure 4:
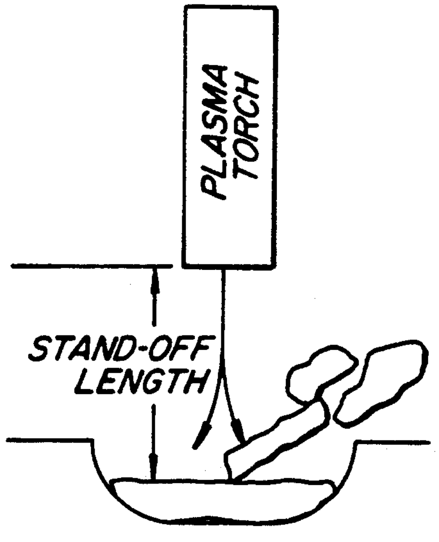
FIGS. 4 and 5 illustrate the differences in plasma torch stand-off lengths achieved with a plasma torch having a tapered-bore electrode and one having a straight-bore electrode, respectively.
Figure 5:
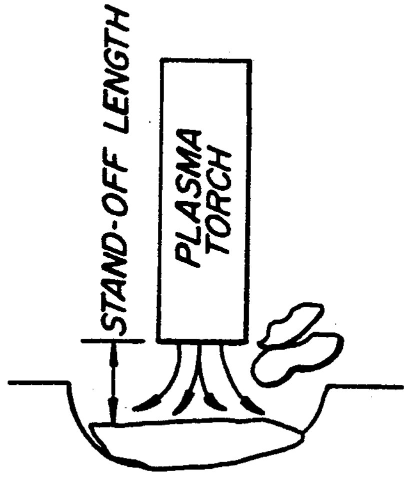
FIG. 5. (PRIOR ART)

As FIGS. 4 and 5 illustrate, under the same voltage and current conditions, the much longer stand-off length obtained with the tapered-bore electrode of the present invention allows for the easy introduction of feed material. The relatively short stand-off length of a prior art straight-bore electrode makes the introduction of feed material difficult and can lead to torch damage due to electrical shorts and/or physical contact between the torch and the feed material.

While the above-described invention refers to a specific apparatus, various other applications and alterations will be obvious to skilled artisans. The spirit and scope of the invention anticipates such other applications and alterations. Only the appended claims limit the scope of the present invention.

What is claimed is:

1. A swirl flow arc plasma torch for producing a long plasma arc comprising:

a torch housing;

an electrode mounted within said housing, having a longitudinally extending axial bore closed at one end and open at another end, a part of the bore adjacent the open end being uniformly tapered, the bore having a diameter at the open end being larger than a diameter of the bore spaced further from the open end, the bore having a length at least twice the diameter at the open end;

a nozzle mounted within the housing forwardly of and spaced from the electrode having an opening in axial alignment with the tapered bore, and means for injecting a gas in swirling fashion between the electrode and the nozzle for generating a swirling gas flow through the nozzle opening during use of the torch; and means for generating an electric arc between an interior portion of the tapered electrode bore and a workpiece located on an end of the nozzle remote from the electrode;

whereby the swirling gas flow rotates the electric arc coaxially with the tapered electrode bore and the nozzle opening and thereby spins an arc termination point inside the tapered bore about an axis of the bore.

2. The torch of claim 1 wherein the bore is defined by an internal wall of the electrode which has a substantially uniform angular inclination relative to the axis of the bore of more than about one degree.

3. The torch of claim 1 wherein the length of said electrode bore is no more than about ten times the diameter of said bore at said mouth end of said electrode.

4. The torch of claim 1 wherein the diameter of said nozzle opening is substantially equal to the diameter of said bore at said mouth end of said electrode.

5. An elongated electrode for use in a swirl flow arc plasma torch which induces a swirling gas flow between the electrode and a workpiece spaced from the torch, the electrode comprising a elongated body forming an internal electrode chamber, an open mouth at one end of the body communicating the chamber with an exterior of the body, the body including another end which is closed, the chamber having a substantially uniform longitudinal taper extending over at least a portion of its length from the open mouth towards the closed end of the body, the taper being defined by an internal, tapered wall which converges in the direction toward the closed end of the body, the bore having a length from the open mouth to the closed end which is at least twice a diameter of the bore at the open mouth, whereby in use the swirling gas flow generated by the torch spins an arc termination point, of an electric arc between the electrode and the workpiece, at the taper of the bore.

6. The electrode of claim 5 wherein the longitudinally tapered portion extends from said open mouth to a first depth dimension spaced from the mouth and the closed end, a remainder of the chamber between said first depth dimension and the closed end having a substantially constant cross-section.

7. A method of operating a plasma torch, the torch including an elongated electrode and a nozzle disposed between a first end of the electrode and a workpiece, and an electric power source coupled with the electrode and the workpiece, the method comprising the steps of:

forming a longitudinal bore in the electrode which is open at the first end of the electrode, closed at a second end of the electrode, and which has a length at least twice a diameter of the bore at the first end;

providing at least a portion of the bore contiguous with the first electrode end with an internal, substantially uniform tapered wall which converges from the first end towards the second end of the electrode;

initiating an electric arc between the electrode and the workpiece;

generating a gas flow from the electrode through the nozzle to the workpiece, whereby the electric arc ionizes the gas flow;

swirling the gas flow about an axis of the electrode bore; and confining a termination point of the electric arc to the tapered portion of the tapered electrode bore wall;

whereby the swirling gas flow rotates the arc termination point about the tapered electrode bore wall portion, and whereby further for a given voltage differential between the electrode and the workpiece a relatively longer arc is generated and a relatively greater distance between the electrode and the workpiece can be maintained.

* * * * *